(12) United States Patent
Allström

(10) Patent No.: US 12,043,058 B2
(45) Date of Patent: Jul. 23, 2024

(54) VEHICLE WHEEL HAVING A HAMMER-DEBOSSED TEXTURE

(71) Applicant: Volvo Car Corporation, Gothenburg (SE)

(72) Inventor: Petter Allström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 976 days.

(21) Appl. No.: 16/561,082

(22) Filed: Sep. 5, 2019

(65) Prior Publication Data

US 2021/0070100 A1    Mar. 11, 2021

(51) Int. Cl.
| | |
|---|---|
| *B60B 1/06* | (2006.01) |
| *B21D 53/26* | (2006.01) |
| *B21D 53/30* | (2006.01) |
| *B21K 1/34* | (2006.01) |

(Continued)

(52) U.S. Cl.
CPC .............. *B60B 1/06* (2013.01); *B21D 53/268* (2013.01); *B21D 53/30* (2013.01); *B21K 1/34* (2013.01); *B60B 1/08* (2013.01); *B60B 7/0053* (2013.01); *B60B 7/0066* (2013.01); *B60B 2310/213* (2013.01); *B60B 2310/318* (2013.01); *B60B 2310/621* (2013.01); *B60B 2310/648* (2013.01);

(Continued)

(58) Field of Classification Search
CPC ........ B60B 2310/648; B60B 2310/656; B60B 2310/622; B60B 2900/572; B60B 2310/60; B60B 2310/614; B60B 2310/621; B60B 2310/318; B60B 1/06; B60B 1/08; B60B 3/06; B60B 3/10; B60B 2310/202; B60B 2310/208; B60B 2310/213; B60B 7/0026–0033; B60B 7/0053; B60B 7/0066–0073; B60B 7/02; B60B 7/18; B21D 31/06; B21D 53/268; B21D 53/30; B21K 1/34
See application file for complete search history.

(56) References Cited

U.S. PATENT DOCUMENTS

| | | | |
|---|---|---|---|
| 1,490,592 A * | 4/1924 | Cromwell ............ | B21D 53/268 29/894.34 |
| 5,908,226 A | 6/1999 | Courtemanche | |
| 7,104,611 B2 | 9/2006 | Alff et al. | |

(Continued)

FOREIGN PATENT DOCUMENTS

JP    2004203297 A    7/2004

OTHER PUBLICATIONS

Translation of JP2004203297 (Year: 2004).*

*Primary Examiner* — Matthew P Travers
(74) *Attorney, Agent, or Firm* — Clements Bernard Walker; Christopher L. Bernard; Devin Cummins (57) ABSTRACT

Wheels for use on vehicles and methods of manufacturing vehicle wheels are described in the present disclosure. According to one embodiment, a method includes a step of manufacturing a wheel that includes a rim, a center disk, and a plurality of spokes. The rim may include a substantially-cylindrical barrel adapted to seal a tubeless tire. The center disk may include a central bore adapted for engagement with an axle of a vehicle. Also, the plurality of spokes may be adapted to connect the center disk to the rim. The method further includes the step of deforming outwardly-facing surfaces of the spokes using one or more hammering or punching instruments.

16 Claims, 11 Drawing Sheets

(51) Int. Cl.
  *B60B 1/08*    (2006.01)
  *B60B 7/00*    (2006.01)
(52) U.S. Cl.
  CPC ..... *B60B 2360/10* (2013.01); *Y10T 29/49492* (2015.01)

(56) References Cited

U.S. PATENT DOCUMENTS

| | | | |
|---|---|---|---|
| 8,740,315 B2 | 6/2014 | Goto | |
| 2004/0135424 A1* | 7/2004 | Ording | B60B 3/085 301/63.106 |
| 2004/0164606 A1* | 8/2004 | Chase | B60B 7/04 301/37.11 |
| 2008/0111419 A1* | 5/2008 | Stahel | B60B 7/006 301/37.41 |
| 2012/0200144 A1* | 8/2012 | Hodges | B60B 1/08 301/104 |
| 2013/0334869 A1* | 12/2013 | Kronemeyer | B60B 7/066 301/37.102 |
| 2015/0246576 A1* | 9/2015 | Nunes | B60B 3/165 301/37.102 |
| 2015/0284836 A1* | 10/2015 | Liu | C25D 11/246 204/192.15 |
| 2016/0368315 A1* | 12/2016 | Nunes | H04L 9/40 |

* cited by examiner

VEHICLE WHEEL HAVING A HAMMER-DEBOSSED TEXTURE

TECHNICAL FIELD

The present disclosure is generally directed to the automotive field. More particularly, the present disclosure relates to the manufacture and treatment of wheels, specifically including processes of embossing and/or debossing an outer surface of the spokes and other structures of a wheel using hammering equipment.

BACKGROUND

Automobile manufacturers typically provide standard features on their vehicles, while also allowing a customer to upgrade various parts of the vehicle to more expensive options. The original equipment manufacturer (OEM) will usually assemble the vehicle parts on an assembly line in a standardized process to produce a majority of the vehicles, but may also produce some vehicles with higher-end upgrades. After manufacturing, an owner may also wish to replace the original parts with aftermarket parts that are designed to fit the particular vehicle. These replacement parts may be produced and offered by the OEM itself or by a separate auto parts manufacturer.

For example, the wheels of a vehicle may often be replaced with upgraded wheels if one or more of the original wheels is damaged or if the owner decides to elevate the performance and strength of the wheels and/or to achieve a more refined or aggressive aesthetic appearance that better suits the owner's tastes. Most wheels manufactured today are no longer designed with a basic utilitarian structure with the intent of covering the wheels with hubcaps or wheel covers, but instead are designed with a more attractive look while still maintaining structural integrity.

Various processes and materials may be used to construct vehicle wheels. Some processes can be used to give the wheels a more attractive look. For example, wheels that are cast or forged with steel, magnesium, aluminum, or an alloy of aluminum and nickel can then be painted with various levels of gloss. Some wheels may be completely formed with chrome or may be chrome-plated over the underlying metal, which gives them a shinier look.

Once cast or forged (and then possibly plated with chrome as one option), the wheels may be treated with other processes including various types of machine finishes that give the wheels a special appearance. Some types of machine finishes include a "diamond cut" process or a mirror-cut process using various types of cutting bits to provide a smooth, reflective surface. The diamond-cut and mirror-cut processes may involve spinning the wheel on a lathe at high speeds and etching the outer surface for the desired look. Other processes, such as polishing and brushing, may be used to produce a clean/reflective finish or to create a number of concentric lines. Some manufacturing techniques may also include a process of applying a translucent clear coat to protect the surfaces from deterioration and to maintain a lustrous finish.

Although various methods of treating wheels are known, there is a need to continue to strive to satisfy customers by providing additional options offering various choices when a customer is shopping for or purchasing a vehicle or when a customer is selecting new or aftermarket wheels.

SUMMARY

The present disclosure describes various embodiments of wheels that may be installed on a vehicle. The present disclosure also describes embodiments of methods of manufacturing such wheels and vehicles that include such wheels. In one embodiment of the present disclosure, a wheel includes at least a rim having a substantially-cylindrical barrel adapted to seal a tubeless tire. The wheel also includes a center disk having a central bore adapted for engagement with an axle of a vehicle. A plurality of spokes are adapted to connect the center disk to the rim. The spokes include a plurality of outwardly-facing surfaces deformed by a metalworking process involving one or more hammering or punching instruments.

According to another embodiment, a method comprises a step of manufacturing a wheel that includes a rim, a center disk, and a plurality of spokes. The rim has a substantially-cylindrical barrel adapted to seal a tubeless tire, and the center disk has a central bore adapted for engagement with an axle of a vehicle. Also, the plurality of spokes is adapted to connect the center disk to the rim. The method further includes the step of deforming outwardly-facing surfaces of the spokes using one or more hammering or punching instruments.

According to yet another embodiment, a vehicle is provided. The vehicle, according to this embodiment, includes at least one axle and a plurality of wheels. Each wheel includes a rim, a center disk, and a plurality of spokes. The rim includes a substantially-cylindrical barrel adapted to seal a tubeless tire. The center disk includes a central bore adapted for engagement with one of the at least one axle. The plurality of spokes is adapted to connect the center disk to the rim. Also, the spokes include a plurality of outwardly-facing surfaces deformed by a metalworking process involving one or more hammering or punching instruments.

BRIEF DESCRIPTION OF THE DRAWINGS

The present disclosure is directed to various embodiments illustrated in the multiple figures and described in the detailed description with reference to the drawings. In the figures, like reference numbers are used to denote like system elements, components, and features and/or method steps. The illustrated elements and components of the various systems are not necessarily drawn to scale.

DESCRIPTION OF EMBODIMENTS

The present disclosure describes various embodiments of wheels that may be installed on a vehicle and various methods of manufacturing these wheels. In particular, the present disclosure includes methods for creating various surface patterns on an outwardly-facing surface of the spokes of the wheels. These surfaces patterns may include an embossed, debossed, repoussé, or chased look. The different manufacturing methods described in the present disclosure may include working the outer surface, applying an additional layer to metal wheel which can then be worked, or working a sheet of material to be added to the metal wheel.

Figure 1:
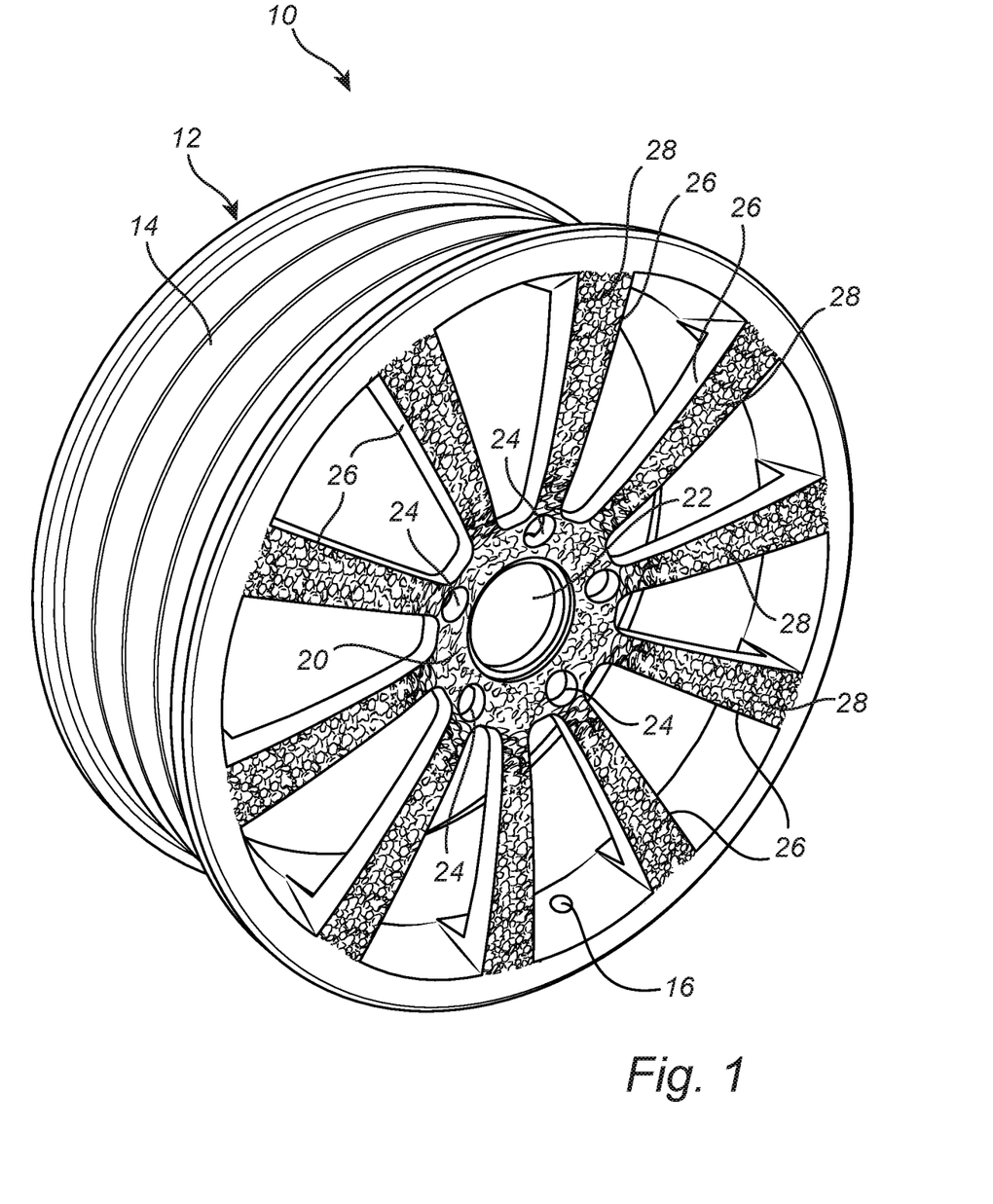
FIG. 1 is a diagram illustrating a perspective view of a first vehicle wheel having an embossed or debossed pattern on an outwardly-facing surface of the spokes of the vehicle wheel, according to various embodiments of the present disclosure.

FIG. 1 is a perspective view showing an embodiment of a first vehicle wheel 10 having an embossed or debossed pattern on an outwardly-facing surface of the spokes of the vehicle wheel 10. The wheel 10 is configured for use on a vehicle (not shown), such as an automobile, truck, van, minivan, sport utility vehicle (SUV), etc. In some embodiments, the vehicle may include two axles (not shown), where each axle is configured to support one wheel on each end of the respective axle. In other embodiments, the vehicle may have any number of axles and any number of wheels. For aesthetic reasons, each particular vehicle usually will have a set of matching wheels, although some vehicle owners may wish to have a first set of wheels on a front axle of the vehicle and a different set of wheels (e.g., larger or wider wheels) on the back axle of the vehicle.

As shown in FIG. 1, the wheel 10 includes a rim 12 having a substantially-cylindrical barrel 14 adapted to seal a tubeless tire (not shown), such as a conventional ring-shaped, rubber tire that surrounds the rim 12 for providing traction on the surface of the road, while also providing a cushioning effect that absorbs shock when the tire rolls over rough surfaces of the road. The rim 12 also includes a valve conduit 16 through which a valve of the tire is inserted when the tire is mounted on the rim 12. The valve allows the tire to be pneumatically inflated with a certain amount of compressed air to maintain the shape of the tire and to allow the tire to sit uniformly on the road surface. The rim 12 may include any conventional or novel unitary, 2-split, 3-split, or multi-split rim including any number and configuration of components, manufactured by any conventional or novel methodology, including forging, etc.

The wheel 10 also includes a center disk 20 having a central bore 22 adapted for engagement with an axle of the vehicle. The center disk 20 also includes a plurality of lug conduits 24 through which a plurality of lug bolts attached to the axle of the vehicle can be inserted. The central bore 22 and lug conduits 24 can be used to mount the wheel 10 in proper alignment with the axle. Lug nuts (not shown) are used to secure the center disk 20 of the wheel 10 onto the axle of the vehicle.

In addition, the wheel 10 includes a plurality of spokes 26 adapted to connect the center disk 20 to the rim 12. According to some alternative embodiments, the spokes 26 may be replaced with a disk plate connecting an entire outer edge of the center disk 20 to an entire inner edge of the rim 12. As described in the present disclosure according to a plurality of various embodiments, the spokes 26 (or disk plate) may include a plurality of outwardly-facing surfaces 28 that include features that differ from ordinary spokes (or ordinary disk plates).

Typically, the face of ordinary spokes has a smooth flat surface and may be polished to provide an unvarying, mirror-type appearance. However, in contrast to the smooth flat surface, the present disclosure provides spokes 26 that have a textured surface. For example, the spokes 26 can be deformed by a metalworking process involving one or more hammering or punching instruments. As such, the metalworking process may involve various embossing, debossing, repoussé, and/or chasing actions, or other types of actions for altering the surface of the metal to form dimples and/or relief portions that either are raised above the other surfaces of the metal and/or are sunken below the other surfaces of the metal. In some embodiments, the raised and/or sunken portions may be formed by one or more hammer devices for creating any pattern, or even a random pattern, of shapes (e.g., circles) of one or more sizes. It should be noted that any of the outwardly-facing surfaces 28 may be finished as provided herein, whether planar or angled surfaces of the spokes 26 or circumferential surfaces disposed about the spokes 26.

Figure 2:
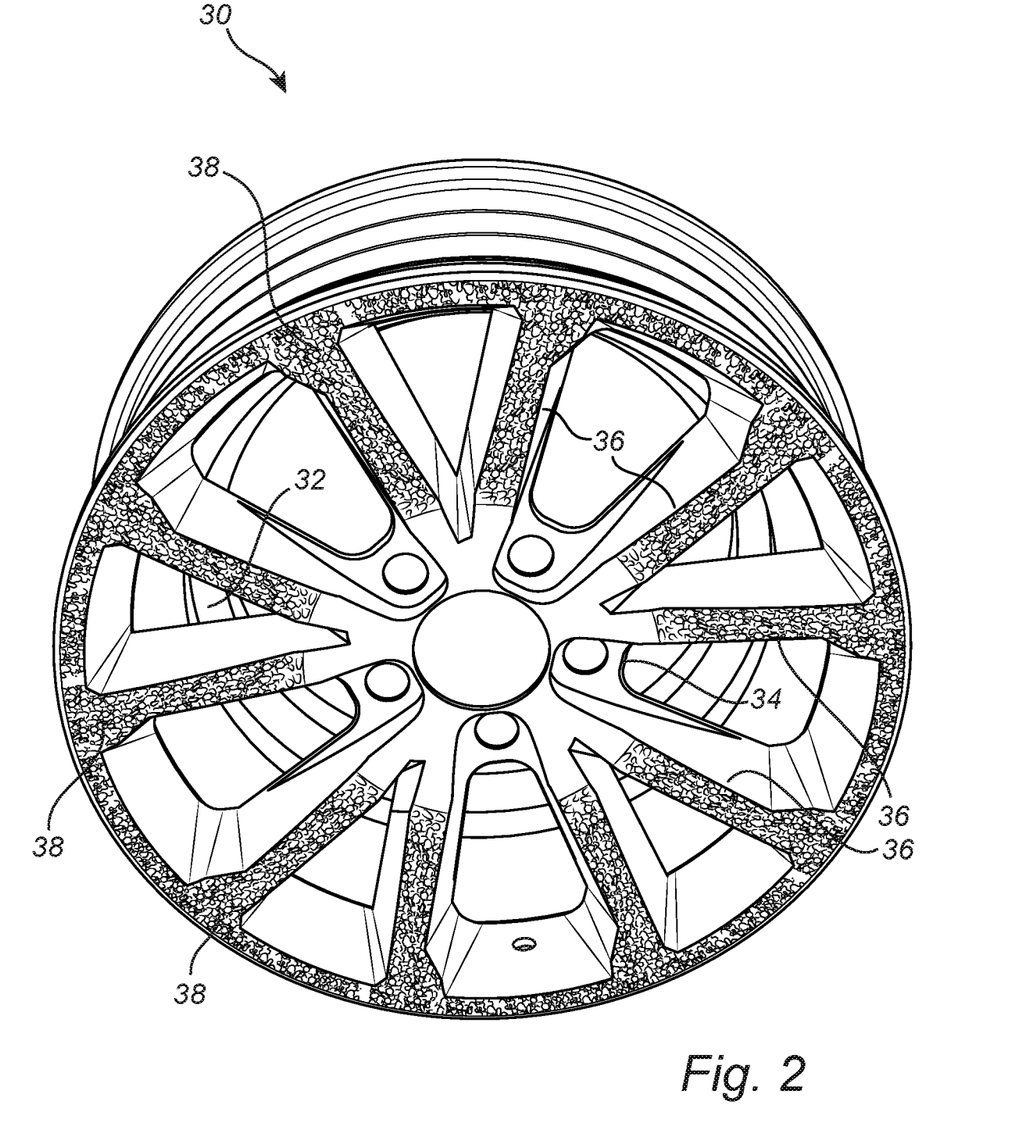
FIG. 2 is a diagram illustrating a front perspective view of a second vehicle wheel having an embossed or debossed pattern on an outwardly-facing surface of the spokes of the vehicle wheel, according to various embodiments of the present disclosure.
Figure 3:
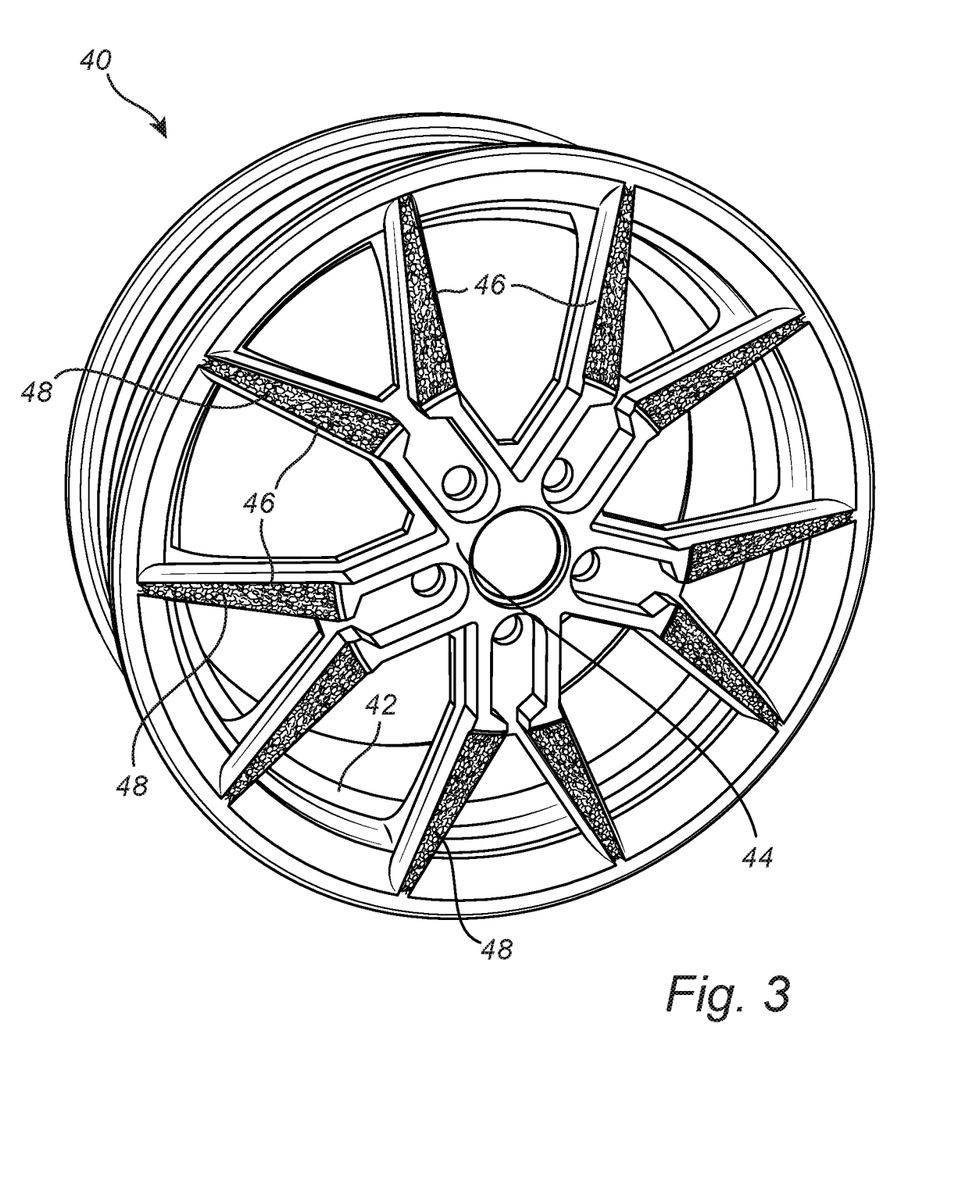
FIG. 3 is a diagram illustrating a front perspective view of a third vehicle wheel having an embossed or debossed pattern on an outwardly-facing surface of the spokes of the vehicle wheel, according to various embodiments of the present disclosure.
Figure 4:
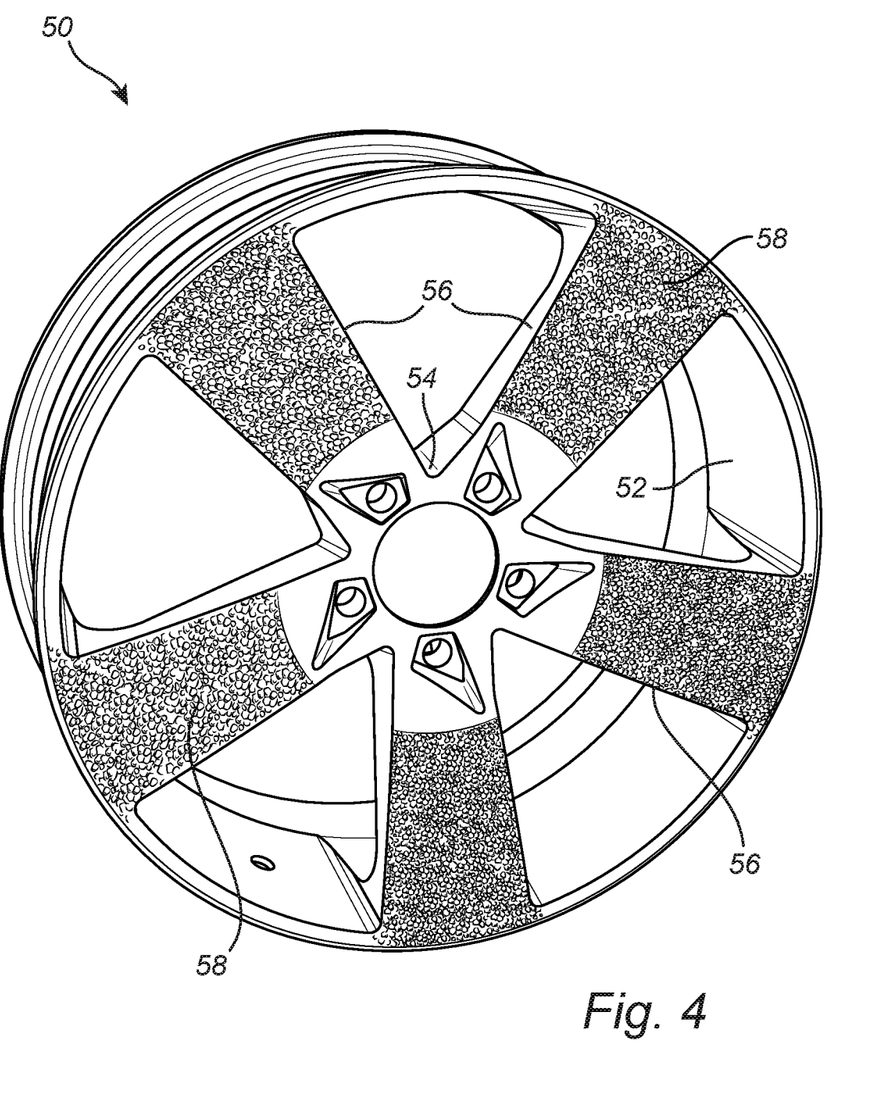
FIG. 4 is a diagram illustrating a front perspective view of a fourth vehicle wheel having an embossed or debossed pattern on an outwardly-facing surface of the spokes of the vehicle wheel, according to various embodiments of the present disclosure.

FIGS. 2-4 are front perspective views of various embodiments of additional wheels having similarities to the wheel 10 of FIG. 1. For example, the second vehicle wheel 30 of FIG. 2 includes a rim 32 and a center disk 34. The second wheel 30 includes a different pattern of spokes 36 connecting the center disk 34 to the rim 32. Also, the outwardly-facing surfaces 38 of the spokes 36 include a textured appearance, deformed by a metalworking process to form raised and/or sunken portions on the surfaces 38, such as a random pattern of circular indentations of various diameters debossed into the surfaces 38. Therefore, the outwardly-facing surfaces 38 of the spokes 36 may give the vehicle an attractive look, particularly since the surfaces 38 may include an embossed or debossed pattern that is clearly visible when viewed from the sides of the vehicle. According to some embodiments, the outwardly-facing surfaces 38 may include one single piece of a different material (or alternatively multiple pieces of the different material) applied to the outer surfaces of the rim 36. In other embodiments, the outer surfaces of the rim 36 itself may be debossed without the addition of extra overlays.

The third vehicle wheel 40 shown in FIG. 3 also includes a rim 42 and a center disk 44. In comparison with the first wheel 10 of FIG. 1 and the second wheel 30 of FIG. 2, the third wheel 40 includes a different pattern of spokes 46 connecting the center disk 44 to the rim 42. Also, the outwardly-facing surface 48 of the spokes 46, like the first and second wheels 10, 30, includes a textured appearance, which may include a treatment of a compound, spackle, paint, or other material to give an appearance as if it has been deformed by a metalworking process. These compounds may be added to form raised and/or sunken portions on the surfaces 48, such as a random pattern of circular indentations of various diameters appearing as if debossed into the surfaces 48. The textured pattern may be formed, as mentioned above, by embossing and/or debossing techniques for altering the outwardly-facing surfaces 48 of the spokes 46 of the wheel 40 and/or by applying various types of compounds.

In FIG. 4, a fourth vehicle wheel 50 is shown. The fourth wheel 50 includes a rim 52 and a center disk 54. The fourth wheel 50 includes a different pattern of spokes 56 connecting the center disk 54 to the rim 52. Also, the outwardly-facing surfaces 58 of the spokes 56 include a textured appearance, deformed by a metalworking process to form raised and/or sunken portions on the surfaces 58, such as a random pattern of circular indentations of various diameters debossed into the surfaces 58. The embossed and/or debossed pattern on an outwardly-facing surface 58 of the spokes 56 in this example may have a different texture than the patterns shown in FIGS. 1-3. This pattern may be created differently for aesthetic reasons in order to account for the greater width of the spokes 56 and/or greater surface area of the spokes 56 when compared with the surfaces 28, 38, 48 of the wheels 10, 30, 40 shown in FIGS. 1-3.

Figure 5:
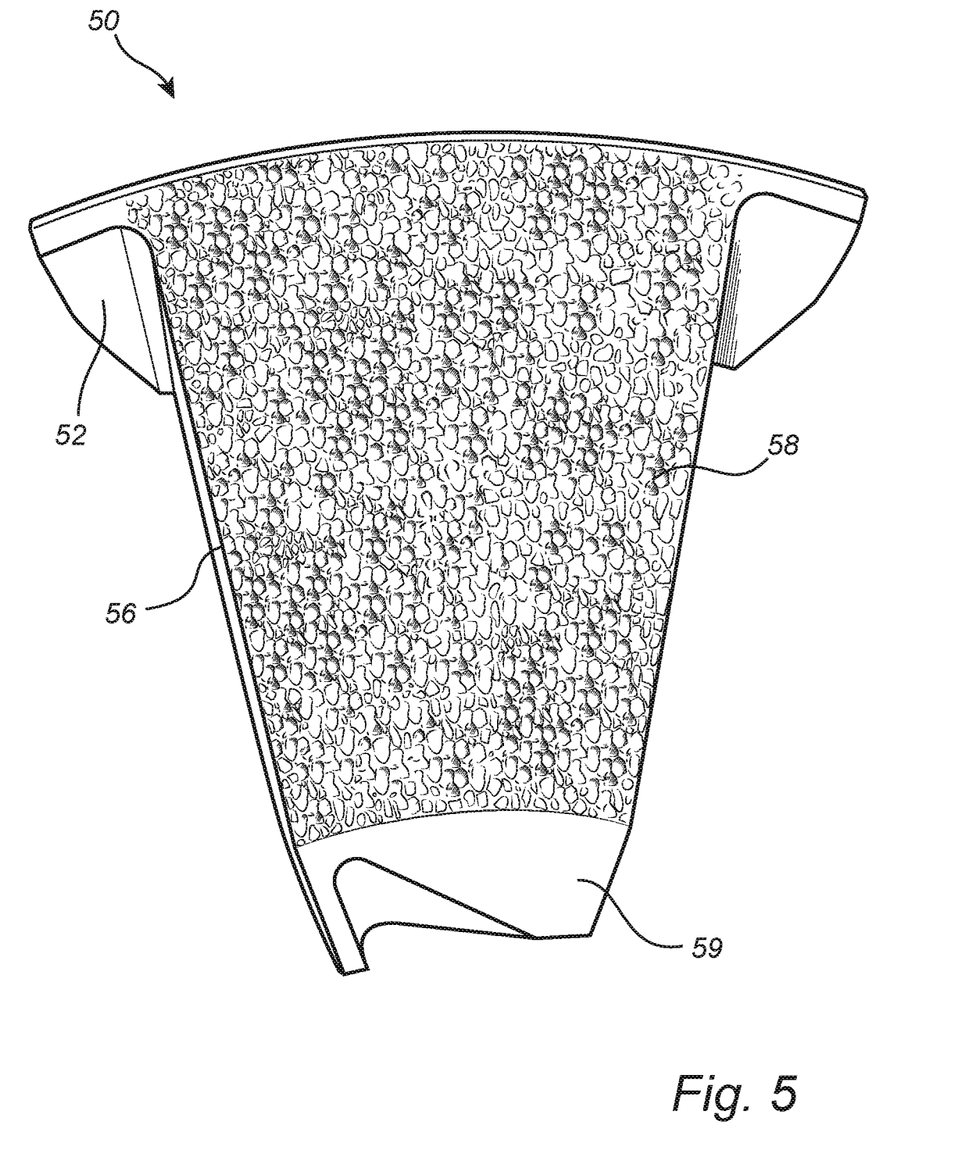
FIG. 5 is a diagram illustrating a front view of a portion of the fourth vehicle wheel of FIG. 4, according to various embodiments.

FIG. 5 is a diagram illustrating a closer view of a portion of the fourth vehicle wheel 50. This view shows the texture of the outwardly-facing surface 58 of one of the spokes 56. As shown, the surface 58 includes a random pattern of dimples, formed using one or more hammering or punching devices for debossing the surface 58. The pattern of dimples may be formed using different sizes of circular ball-peen or dome-shaped elements. Also, hammering or punching devices may be configured to strike the metal with varying forces to create indentations of varying depths. Furthermore, according to some embodiments, less than the entire outwardly-facing surface 58 of the spokes may be embossed/debossed. For example, a portion 59 of the outwardly-facing surface may be remain smooth. This contrast between the worked surface (e.g., surface 58) and the unworked surface (e.g., surface 59) may create a desirable visual effect.

Figure 6:
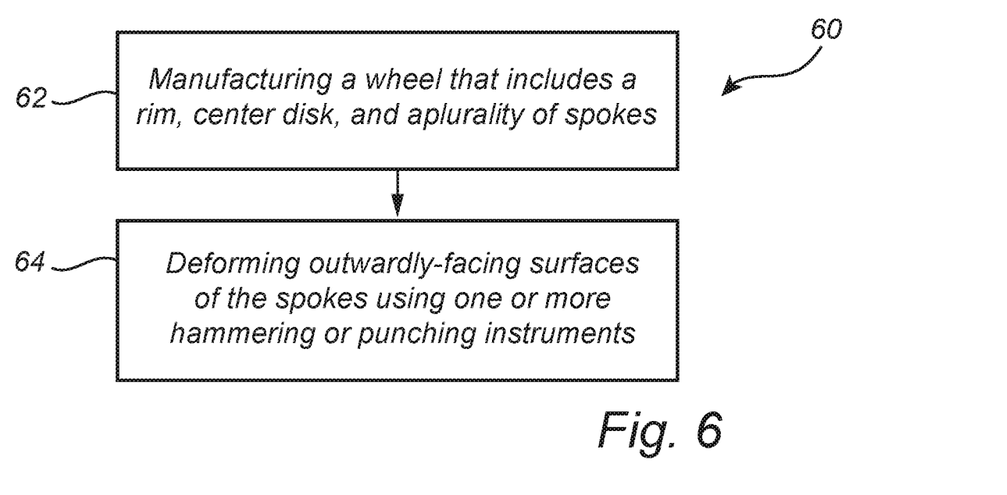
FIG. 6 is a flow diagram illustrating a first method of manufacturing a vehicle wheel having an embossed or debossed pattern on an outwardly-facing surface of the spokes of the vehicle wheel, according to various embodiments of the present disclosure.

FIG. 6 is a flow diagram showing a first embodiment of a method 60 for manufacturing a vehicle wheel (e.g., wheel 10, 30, 40, 50) having an embossed or debossed pattern on an outwardly-facing surface (e.g., surface 28, 38, 48, 58) of the spokes (e.g., spokes 26, 36, 46, 56) of the respective wheel. In this embodiment, the method 60 includes a step, as indicated in block 62, of manufacturing a wheel that includes a rim, a center disk, and a plurality of spokes.

More particularly, the wheel may be manufactured such that the rim has a substantially cylindrical barrel adapted to seal a tubeless tire. Also, the center disk may be created with a central bore adapted for engagement with an axle of a vehicle. The spokes of the wheel are adapted to connect the center disk to the rim.

For example, the step of manufacturing the wheel, as described with respect to block 62, may include one or more steps of gravity casting, pressure casting, and/or forging of various material, such as steel, magnesium, chromium, carbon fiber, and/or a metal alloy. After manufacturing the wheel, the method 60 includes treating the wheel to give it an embossed or debossed texture. As indicated in block 64, the method 60 of FIG. 6 further includes the step of deforming outwardly-facing surfaces of the spokes using one or more hammering or punching instruments.

According to some embodiments of the present disclosure, the outwardly-facing surfaces of the spokes may include an added layer that overlays at least portions of an outer portion of the spokes. For example, the method 60 may further include the step of plating the outwardly-facing surfaces of the spokes with an overlaid layer of material including at least one of chromium, aluminum, nickel, copper, bronze, and/or tin. In this respect, the step of deforming (e.g., block 64) may include the step of debossing the overlaid layer after the step of plating the outwardly-facing surfaces of the spokes. The step of deforming, as described with respect to block 64, may alternatively include the step of embossing and/or debossing the overlaid layer before the step of plating the outwardly-facing surfaces of the spokes. The step of plating may further include a step of applying an adhesive between the overlaid layer and the spokes. Furthermore, the step of plating may further include the step of electroplating the overlaid layer onto the outwardly-facing surfaces of the spokes.

The method 60 may include other additional and/or alternative steps. For example, the step of deforming (e.g., block 64) may include the step of hammering or punching the outwardly-facing surfaces of the spokes with a plurality of hammering or punching instruments having a plurality of sizes of ball-peens or punching domes. Also, the step of deforming (e.g., block 64) may include the step of creating a dimpled texture in the outwardly-facing surfaces of the spokes. The step of creating the dimpled texture, for instance, may include a step of creating a random pattern of dimples.

Block 64 (e.g., the step of deforming) may further include the step of performing a metalworking process to create raised relief portions and/or sunken dimple portions in the outwardly-facing surfaces of the spokes. The raised relief portions and/or sunken dimple portions, for instance, may be circular. Also, the raised relief portions and/or sunken portions may be formed with varying depths. The method 60 of FIG. 6 may further comprise the step of annealing the outwardly-facing surfaces of the spokes before the deforming step of block 64 to make the metal more malleable.

The method 60 may further comprise the steps of priming and painting the plurality of spokes, which may be performed before the step of deforming the outwardly-facing surfaces of the spokes. Also, after painting the spokes and after the step of deforming the outwardly-facing surfaces of the spokes, the method 60 may further include the step of applying a protective coating (e.g., clear coat) over the spokes.

Figure 7:
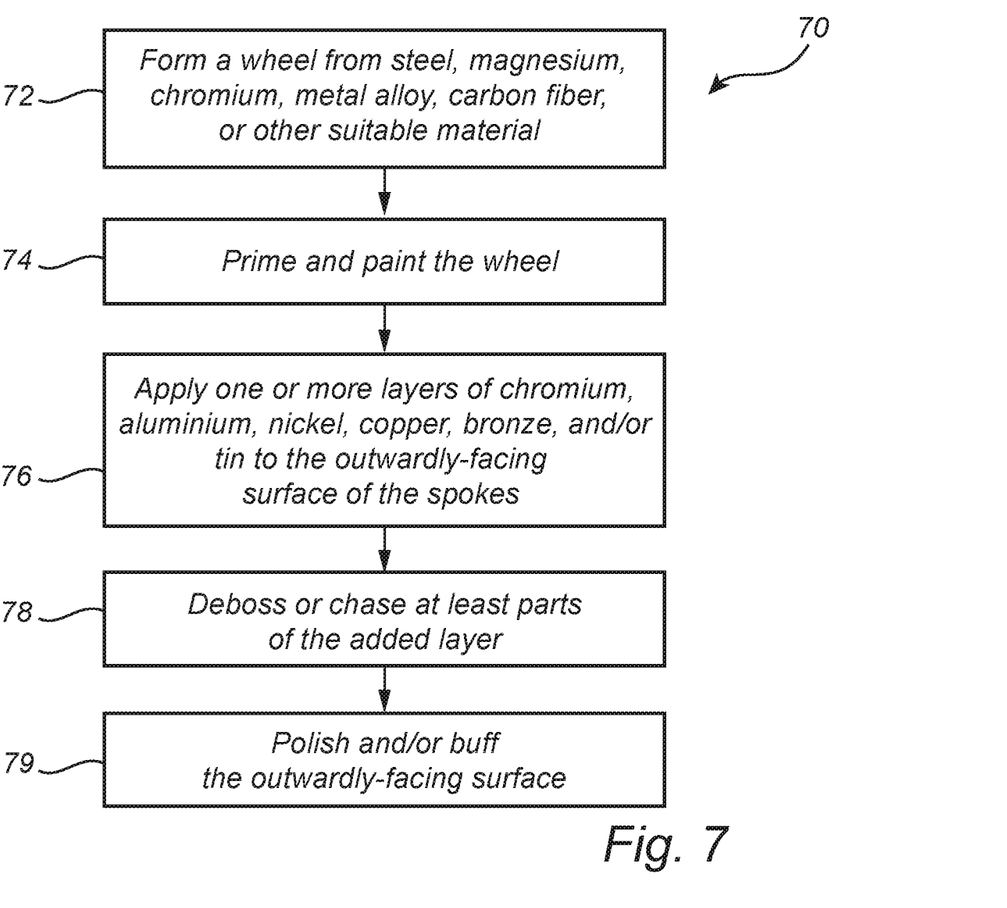
FIG. 7 is a flow diagram illustrating a second method of manufacturing a vehicle wheel having an embossed or debossed pattern on an outwardly-facing surface of the spokes of the vehicle wheel, according to various embodiments of the present disclosure.

FIG. 7 is a flow diagram illustrating a second embodiment of a method 70 of manufacturing a vehicle wheel having an embossed or debossed pattern on an outwardly-facing surface of the spokes of the vehicle wheel. The method 70 includes the step of forming a wheel from steel, magnesium, chromium, metal alloy, carbon fiber, or other suitable material, as indicated in block 72.

For example, the manufactured wheel may include a rim having a substantially cylindrical barrel adapted to seal a tubeless tire, a center disk having a central bore adapted for engagement with an axle of a vehicle, and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

The method 70 further includes the step of priming and painting the wheel, as indicated in block 74. In some embodiments, the entire wheel may be primed and painted, whereby other embodiments may include priming and/or painting limited portions of the wheel. Block 74 may be an optional step in some embodiments.

Block 76 of method 70 includes the step of adding or applying one or more layers of chromium, aluminum, nickel, copper, bronze, and/or tin to an outer surface of the spokes. This step may include a plating process or an electroplating process. Also, the step of adding the one or more layers (e.g., block 76) may further include adding an adhesive between the added layers and the outwardly-facing side of the spokes and/or adding an adhesive between the individual layers themselves.

The method 70 of FIG. 7 further includes the step of debossing or chasing at least parts of the added layer or layers, as indicated in block 78. Thus, the debossing or chasing is performed after the added layer or layers are applied to the spokes. The outwardly-facing surfaces of the spokes can therefore be deformed (e.g., by debossing or chasing) using a metalworking process, such as one involving one or more hammering or punching instruments. Other various instruments or tools can be used to perform the debossing or chasing processes. These instruments or tools, according to some embodiments, may be part of a machine for altering the appearance of the wheel or may be part of the manufacturing machinery.

According to block 79, the method 70 may further include the step polishing and/or buffing the outwardly-facing surfaces. The step indicated by block 79 may be an optional step. Since the added layer may include chromium or other similar element that naturally includes reflective properties, the method 70 may not necessarily need to add a clear coat. However, in some embodiments, a translucent clear coat may be added at this point.

Figure 8:
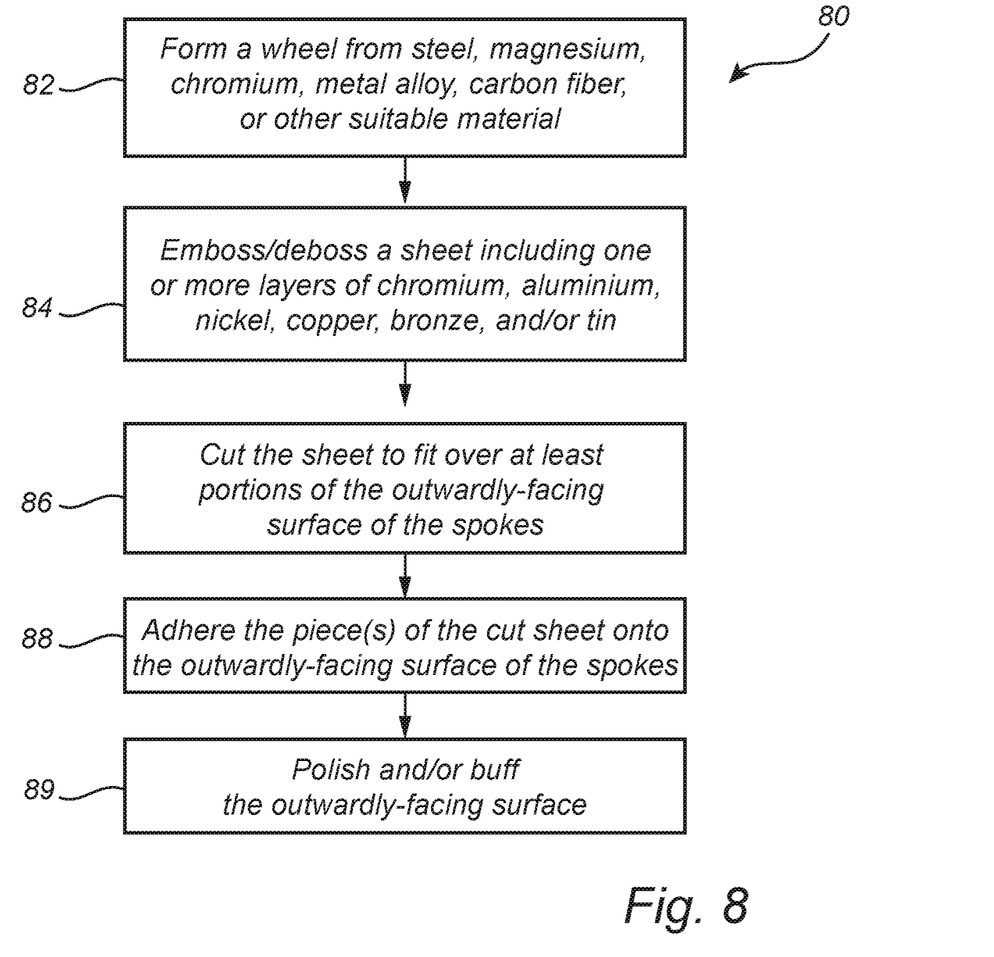
FIG. 8 is a flow diagram illustrating a third method of manufacturing a vehicle wheel having an embossed or debossed pattern on an outwardly-facing surface of the spokes of the vehicle wheel, according to various embodiments of the present disclosure.

FIG. 8 is a flow diagram illustrating a third embodiment of a method 80 of manufacturing a vehicle wheel having an embossed or debossed pattern on an outwardly-facing surface of the spokes of the vehicle wheel. In this embodiment, the method 80 includes the step of forming a wheel from steel, magnesium, chromium, metal alloy, carbon fiber, and/or other suitable material, as indicated in block 82.

For example, the manufactured wheel may include a rim having a substantially-cylindrical barrel adapted to seal a tubeless tire. The wheel may also include a center disk having a central bore adapted for engagement with an axle of a vehicle and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

The method 80 of FIG. 8 further includes a step of embossing and/or debossing a sheet of material including one or more layers of chromium, aluminum, nickel, copper, bronze, tin, and/or other suitable materials, as indicated in block 84. It should be noted that the embossing and/or debossing step of block 84 may be performed separately from the manufacturing step of block 82. That is, the embossed/debossed surface may be created before, during, or after the wheel is formed (e.g., block 82), and the surface may be embossed/debossed with the sheet of material not already applied to the wheel. Furthermore, the embossing and/or debossing may include the process of only embossing and/or debossing certain portions of the sheet of material, if, for example, only portions of the outwardly-facing surface of the spokes are intended to be worked.

As indicated in block 86, the method 80 includes cutting the embossed/debossed sheet to fit at least a portion of the outwardly-facing surface of the wheel that was formed in block 82. In some embodiments, the cutting process of block 86 may further include steps to file the cut edges to smooth the edges and eliminate sharp corners. Also, the cutting process of block 86 may include cutting the sheet into one or more pieces. As indicated in block 88, the method 80 further includes the step of adhering the piece or pieces of the cut sheet to the spokes according to the intended artistic design of the wheel. In this case, the step of adhering (e.g., block 88) may not necessarily include a plating technique since the plating technique may be detrimental to the intended embossed/debossed patterns already formed on prepared sheet. The method 80 may further include, as an option, the step of polishing and/or buffing the outwardly-facing surfaces, as indicated in block 89.

Figure 9:
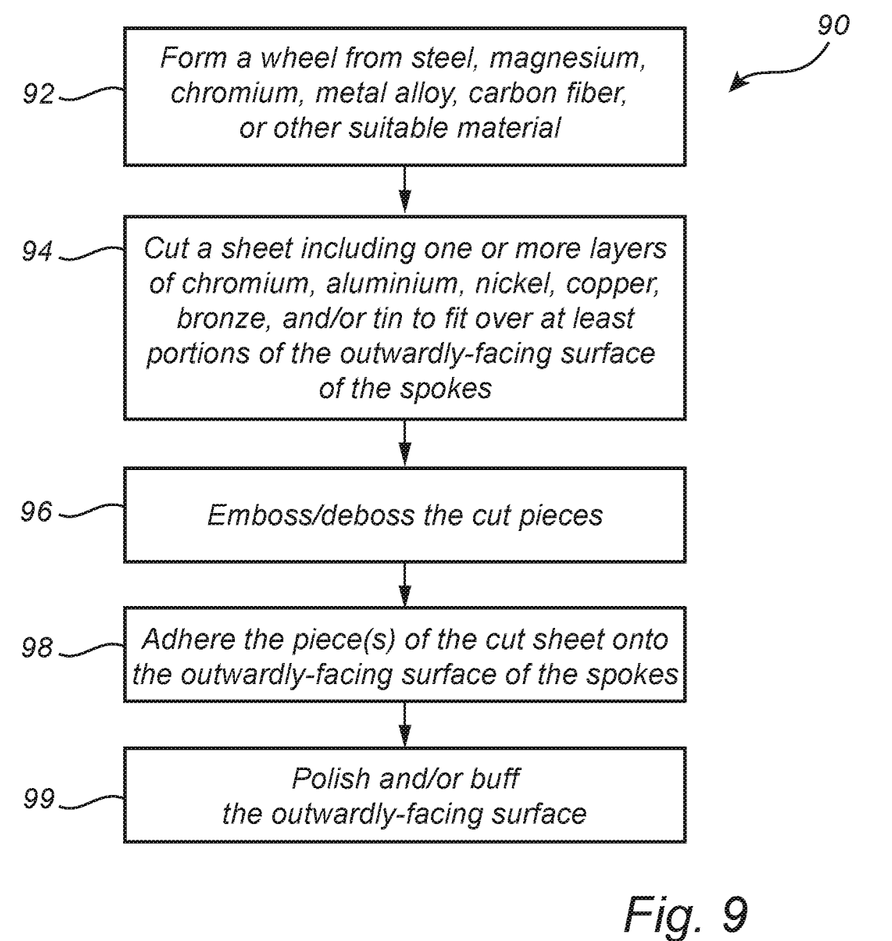
FIG. 9 is a flow diagram illustrating a fourth method of manufacturing a vehicle wheel having an embossed or debossed pattern on an outwardly-facing surface of the spokes of the vehicle wheel, according to various embodiments of the present disclosure.

FIG. 9 is a flow diagram illustrating a fourth embodiment of a method 90 of manufacturing a vehicle wheel having an embossed or debossed pattern on an outwardly-facing surface of the spokes of the vehicle wheel. The method 90 includes the step of forming a wheel from steel, magnesium, chromium, metal alloy, carbon fiber, or other suitable material, as indicated in block 92.

For example, the wheel may include: a rim having a substantially-cylindrical barrel adapted to seal a tubeless tire, a center disk having a central bore adapted for engagement with an axle of a vehicle, and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

As indicated in block 94, the method 90 includes cutting a sheet of material to fit at least a portion of the outwardly-facing surface of the wheel formed in block 92. The sheet may include one or more layers of chromium, aluminum, nickel, copper, bronze, and/or tin. In some embodiments, the cutting process of block 94 may further include steps to file the cut edges to smooth the edges and eliminate sharp corners. Also, the cutting process of block 94 may include cutting the sheet into one or more pieces.

According to block 96, the method 90 also includes the step of embossing and/or debossing the piece or pieces that have been cut from the sheet in block 94. This step may include placing the cut piece or pieces in a gripping and/or molding device to allow the embossing/debossing without the piece or pieces moving out of place.

As indicated in block 98, the method 90 further includes the step of adhering the piece or pieces of the cut sheet to the spokes according to the intended artistic design of the wheel. In this case, the step of adhering (e.g., block 98) may not necessarily into a plating technique since it may be possible that the plating technique may alter the embossed/debossed patterns already formed on prepared sheet. The method 90 may further include, as an option, the step of polishing and/or buffing the outwardly-facing surfaces, as indicated in block 99.

Figure 10:
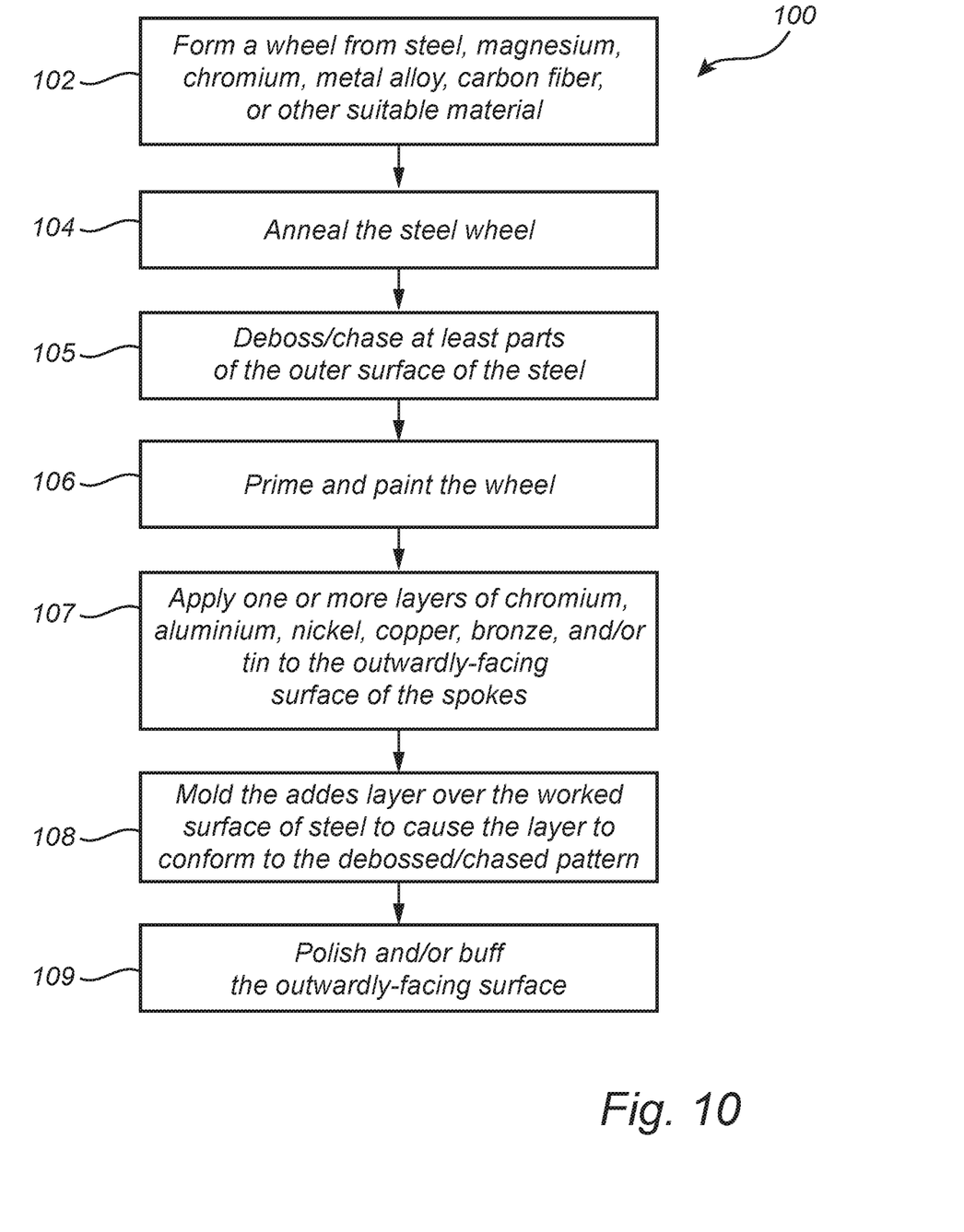
FIG. 10 is a flow diagram illustrating a fifth method of manufacturing a vehicle wheel having an embossed or debossed pattern on an outwardly-facing surface of the spokes of the vehicle wheel, according to various embodiments of the present disclosure.

FIG. 10 is a flow diagram illustrating a fifth embodiment of a method 100 of manufacturing a vehicle wheel having an embossed or debossed pattern on an outwardly-facing surface of the spokes of the vehicle wheel. The method 100 includes the step of forming a wheel from steel, magnesium, chromium, metal alloy, carbon fiber, or other suitable material, as indicated in block 102.

For example, the manufactured wheel may include a rim having a substantially-cylindrical barrel adapted to seal a tubeless tire, a center disk having a central bore adapted for engagement with an axle of a vehicle, and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

As indicated in block 104, the method 100 of FIG. 10 further includes the step of heating or annealing the metal material of the wheel formed in block 102. This heating process (e.g., block 104 and subsequent block 105) may be performed during or after the manufacturing step of block 102. While the metal is heated, the method 100 includes the step of debossing (or chasing) at least parts of the outer surface of the spokes where the intended worked pattern is to be formed, as indicated in block 105. According to an alternative embodiment, the blocks 102, 104, 105 may be replaced by a manufacturing step (similar to block 102), whereby the wheel is formed with a debossed/embossed pattern already formed on the outwardly-facing surfaces of the spokes.

After the metalworking processes of blocks 102, 104, and 105, the method 100 includes the step of priming and painting the wheel, which has the embossed/debossed textured surface, as indicated in block 106. The entire wheel or less than the entire wheel can be primed and painted, depending of various aesthetic designs. In some embodiments, the priming/painting step (e.g., block 106) may be selected as an option, performed at a later time, or omitted altogether.

The method 100 may further include the step of adding one or more layers of chromium, aluminum, nickel, copper, bronze, and/or tin to an outer surface of the spokes, as indicated in block 107. This step may include a plating process or an electroplating process. Also, the step of adding the one or more layers (e.g., block 107) may further include adding an adhesive between the added layers and the outwardly-facing side of the spokes and/or adding an adhesive between the individual layers themselves.

Furthermore, the method 100 may also include the step of performing a fitting process, such as stamping and/or heating, as indicated in block 108. This step may include pressing, stamping, molding, or otherwise fitting the added layer over the worked surface of the metal wheel to cause the added layer to conform to the debossed pattern formed on the metal. In this way, the more lustrous layer of chromium, aluminum, etc., may be formed over the metal (e.g., which may be painted black or other suitable background color) to cause the added layer to stand out from the metal and more clearly portray the debossed pattern. In addition, the method 100 may further include the step of polishing and/or buffing the surface, as indicated in the optional process of block 109.

Figure 11:
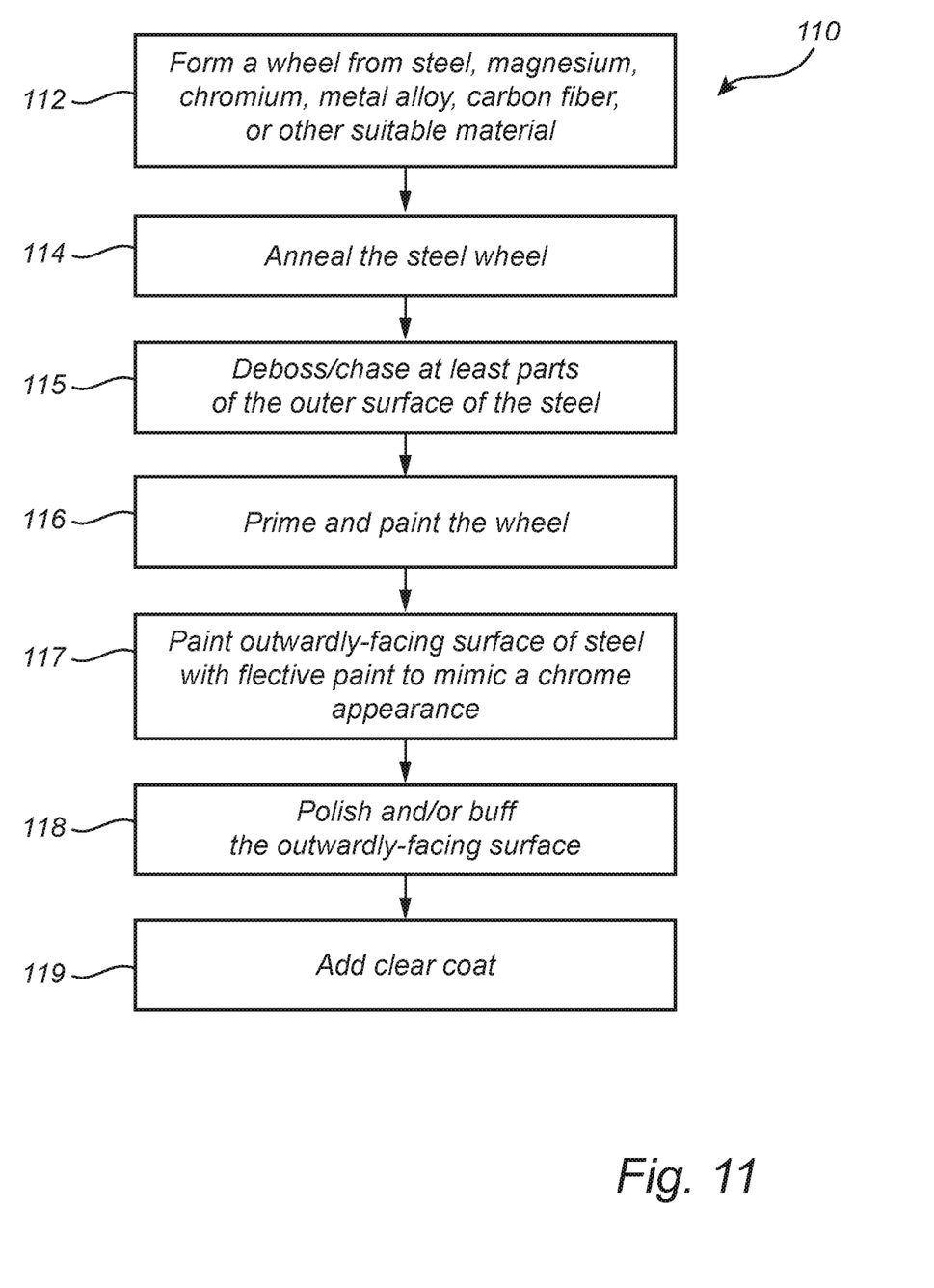
FIG. 11 is a flow diagram illustrating a sixth method of manufacturing a vehicle wheel having an embossed or debossed pattern on an outwardly-facing surface of the spokes of the vehicle wheel, according to various embodiments of the present disclosure.

FIG. 11 is a flow diagram illustrating a sixth embodiment of a method 110 of manufacturing a vehicle wheel having an embossed or debossed pattern on an outwardly-facing surface of the spokes of the vehicle wheel. The method 110 includes the step of forming a wheel from steel, magnesium, chromium, metal alloy, carbon fiber, or other suitable material, as indicated in block 112.

For example, the manufactured wheel may include a rim having a substantially-cylindrical barrel adapted to seal a tubeless tire, a center disk having a central bore adapted for engagement with an axle of a vehicle, and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

As indicated in block 114, the method 110 of FIG. 11 further includes the step of heating or annealing the metal material of the wheel formed in block 112. This heating process (e.g., block 114 and subsequent block 115) may be performed during or after the manufacturing step of block 112. While the metal is heated, the method 110 includes the step of debossing (or chasing) at least parts of the outer surface of the spokes where the intended worked pattern is to be formed, as indicated in block 115. According to an alternative embodiment, the blocks 112, 114, 115 may be replaced by a manufacturing step (similar to block 112), whereby the wheel is formed with a debossed/embossed pattern already formed on the outwardly-facing surfaces of the spokes.

After the metalworking processes of blocks 112, 114, and 115, the method 110 includes the step of priming and painting the wheel, which has the embossed/debossed textured surface, as indicated in block 116. The entire wheel or less than the entire wheel can be primed and painted, depending of various aesthetic designs. In some embodiments, the priming/painting step (e.g., block 116) may be selected as an option, performed at a later time, or omitted altogether.

In addition, the method 110 of FIG. 11 includes the step of painting an outwardly-facing surface of the metal spokes with a layer of high-gloss or reflective paint, as indicated in block 117. For example, the paint color may be silver and have the appearance of chrome. The paint may be applied to at least the embossed/debossed areas of the surface to give the surface the appearance of a reflective chrome material applied over a background color (e.g., black).

The method 110 further include the step of polishing and/or buffing the outwardly-facing surfaces, as indicated in block 118. The step indicated by block 118 may be an optional step. In addition, the method 110 may include adding a clear coat, as indicated in block 119.

Figure 12:
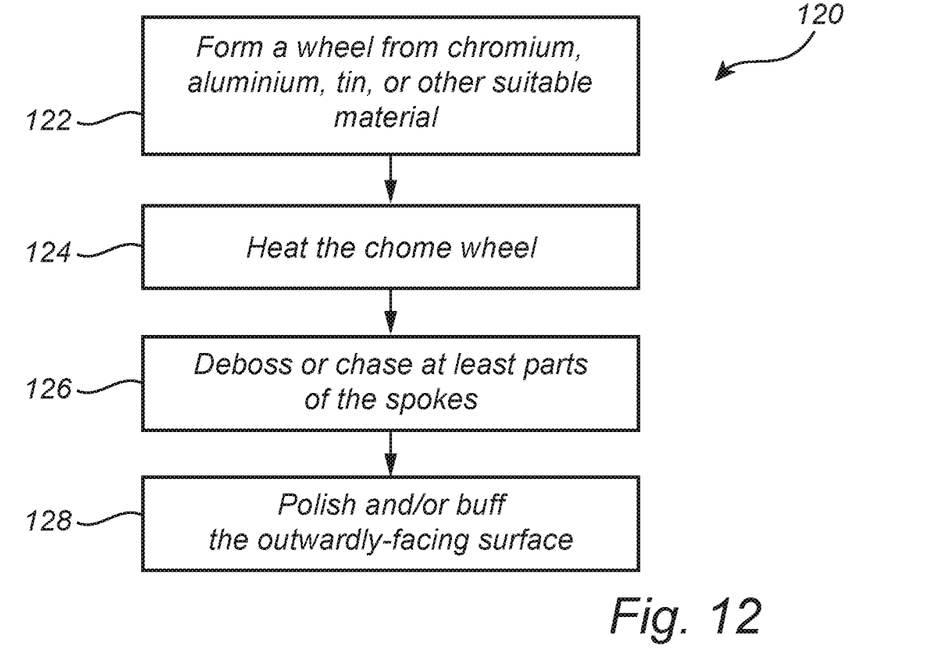
FIG. 12 is a flow diagram illustrating a seventh method of manufacturing a vehicle wheel having an embossed or debossed pattern on an outwardly-facing surface of the spokes of the vehicle wheel, according to various embodiments of the present disclosure.

FIG. 12 is a flow diagram illustrating a seventh embodiment of a method 120 of manufacturing a vehicle wheel having an embossed or debossed pattern on an outwardly-facing surface of the spokes of the vehicle wheel. The method 120 includes the step of forming a wheel, as indicated in block 122. However, instead of using steel, magnesium, a metal alloy, carbon fiber, or other similar material, as mentioned above with respect to methods 70, 80, 90, 100, 110, the wheel forming step of block 122 includes manufacturing the wheel with chromium, aluminum, tin, or other suitable material having a naturally reflective characteristic.

The manufactured wheel may include a rim having a substantially-cylindrical barrel adapted to seal a tubeless tire, a center disk having a central bore adapted for engagement with an axle of a vehicle, and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

After or during the process of manufacturing the wheel, the method 120 may include heating or annealing the chromium or other material, as indicated in block 124, to allow the material to be more malleable. When heated to the point where the material can be easily molded, the method 120 further includes debossing at least portions of the outwardly-facing surfaces of the spokes, as indicated in block 126. The method 120 further includes the step of polishing and/or buffing the outwardly-facing surfaces, as indicated in block 128, which may be an optional step in some embodiments.

Figure 13:
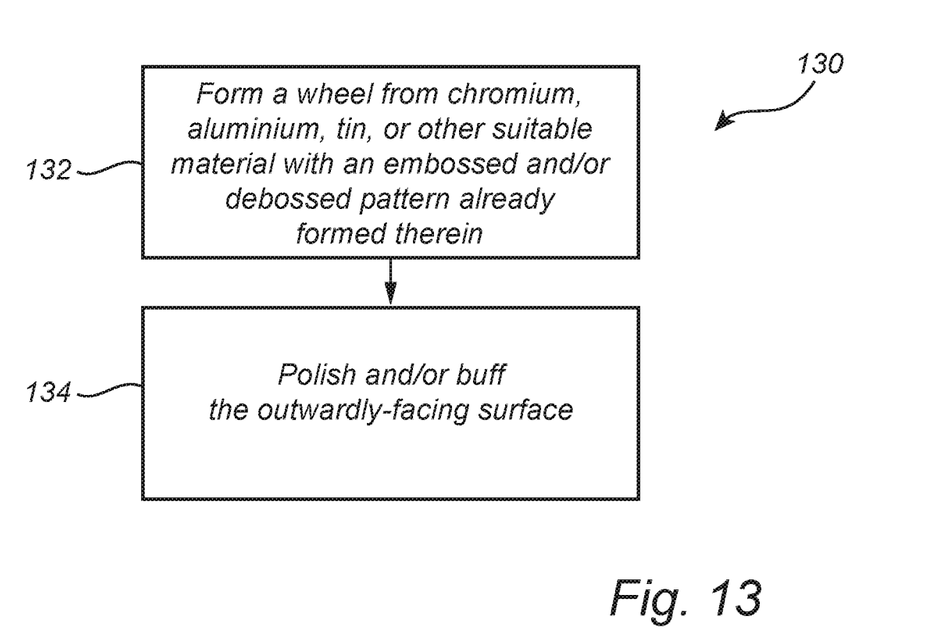
FIG. 13 is a flow diagram illustrating an eighth method of manufacturing a vehicle wheel having an embossed or debossed pattern on an outwardly-facing surface of the spokes of the vehicle wheel, according to various embodiments of the present disclosure.

FIG. 13 is a flow diagram illustrating an eighth embodiment of a method 130 of manufacturing a vehicle wheel having an embossed or debossed pattern on an outwardly-facing surface of the spokes of the vehicle wheel. The method 130 includes the step of forming a wheel, as indicated in block 132. However, instead of using steel, magnesium, a metal alloy, carbon fiber, or other similar material, as mentioned above with respect to methods 70, 80, 90, 100, 110, the wheel forming step of block 132 includes manufacturing the wheel with chromium, aluminum, tin, or other suitable material having a naturally reflective characteristic. Also, instead of performing a debossing step as mentioned with respect to block 126 of the method 120 of FIG. 12, the manufacturing process of block 132 includes molding the material such that it includes an embossed and/or debossed pattern already formed thereon.

The manufactured wheel may include a rim having a substantially-cylindrical barrel adapted to seal a tubeless tire, a center disk having a central bore adapted for engagement with an axle of a vehicle, and a plurality of spokes adapted to connect the center disk to the rim. The wheel may be manufactured as a single part, or alternatively, may be formed as two or more parts that can be welded together or connected together by bolts. In some embodiments, the rim may be manufactured separately from the spokes and center disk, whereby the spokes can then be bolted onto the rim.

After forming the wheel with the embossed/debossed pattern already formed, the method 130 includes the step of polishing and/or buffing the chromium (or other) material, as indicated in block 134. In some embodiments, the step of polishing/buffing may be optional.

It should be noted that the terms "first," "second", "third," etc. are used throughout the present disclosure simply to distinguish one part or component from another and are not necessarily intended to define any sequence or order of significance. Also, the terms "up," "down," "front," "rear," "top," "bottom," etc. are used to define the parts or components relative to one another and do not necessarily limit the embodiments to a single three-dimensional viewpoint, but allow implementations where the parts or components can be manipulated into any useful configurations or orientations according to an understanding of the description of the various embodiments as taught in the present disclosure.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A method of forming a vehicle wheel, comprising the steps of:
providing a wheel that includes a rim, a center disk, and a plurality of spokes, where the rim has a substantially-cylindrical barrel on one side of the rim adapted to seal a tubeless tire, where the center disk has a central bore adapted for engagement with an axle of a vehicle, and where the plurality of spokes are adapted to connect the center disk to the rim;
providing a sheet of material including at least one of chromium, aluminum, nickel, copper, bronze, and tin, the sheet of material including a sheet rim and a plurality of sheet spokes;
deforming one or more outwardly-facing surfaces of each sheet spoke of the plurality of sheet spokes of the sheet of material using one or more hammering or punching instruments, wherein each of the deformed one or more outwardly-facing surfaces of each sheet spoke of the plurality of sheet spokes is entirely positioned at a radial distance from a center of the sheet of material greater than a radial separation distance such that all of the outwardly-facing surfaces of the plurality of sheet spokes positioned at radial distances from the center of the sheet of material greater than the radial separation distance define worked surfaces;
leaving one or more outwardly-facing surfaces of each sheet spoke of the plurality of sheet spokes of the sheet of material positioned at a radial distance from the center of the sheet of material less than the radial separation distance undeformed by the one or more hammering or punching instruments such that all of the outwardly-facing surfaces of the plurality of sheet spokes positioned at radial distances from the center of the sheet of material less than the radial separation distance define smooth unworked surfaces; and
plating, subsequent to deforming the one or more outwardly-facing surfaces of the plurality of sheet spokes of the sheet of material, one or more outwardly-facing surfaces of the plurality of spokes of the wheel with the sheet of material such that one or more inwardly-facing surfaces of the plurality of sheet spokes of the sheet of material are disposed on the one or more outwardly-facing surfaces of the plurality of spokes of the wheel, the one or more outwardly-facing surfaces of the plurality of spokes disposed on a side of the plurality of spokes opposite from a side of the plurality of spokes facing the substantially-cylindrical barrel such that the one or more deformed outwardly-facing surfaces of each sheet spoke of the plurality of sheet spokes and all the undeformed outwardly-facing surfaces of the plurality of sheet spokes of the sheet of material are visible from an exterior side of the vehicle when the wheel plated with the sheet of material is disposed on the axle of the vehicle.

2. The method of claim 1, wherein the step of deforming includes the step of embossing or debossing the one or more outwardly-facing surfaces of the plurality of sheet spokes of the sheet of material.

3. The method of claim 1, wherein the step of plating further includes applying an adhesive between the sheet of material and the plurality of spokes of the wheel.

4. The method of claim 1, wherein the step of deforming includes the step of hammering or punching the one or more outwardly-facing surfaces of the plurality of sheet spokes of the sheet of material with a plurality of hammering or punching instruments having a plurality of sizes of ball-peens or punching domes.

5. The method of claim 1, wherein the step of deforming includes the step of creating a dimpled texture in the one or more outwardly-facing surfaces of the plurality of sheet spokes of the sheet of material.

6. The method of claim 5, wherein the step of creating the dimpled texture includes creating a random pattern of dimples.

7. The method of claim 1, wherein the step of deforming includes the step of performing a metalworking process to create raised relief portions and/or sunken dimple portions in the one or more outwardly-facing surfaces of the plurality of sheet spokes of the sheet of material.

8. The method of claim 7, wherein the raised relief portions and/or sunken dimple portions are circular.

9. The method of claim 7, wherein the raised relief portions and/or sunken portions have varying depths.

10. The method of claim 1, further comprising the step of annealing the one or more outwardly-facing surfaces of the plurality of spokes of the wheel before the deforming step.

11. The method of claim 1, further comprising the steps of priming and painting the plurality of sheet spokes of the sheet of material before the step of deforming the one or more outwardly-facing surfaces of the plurality of sheet spokes of the sheet of material.

12. The method of claim 11, further comprising the step of applying a protective coating over the one or more outwardly-facing surfaces of the plurality of sheet spokes of the sheet of material after the step of deforming the one or more outwardly-facing surfaces of the plurality of sheet spokes of the sheet of material.

13. The method of claim 1, wherein the step of providing the wheel includes the step of gravity casting, pressure casting, or forging steel, magnesium, chromium, carbon fiber, or a metal alloy.

14. The method of claim 1, further comprising:
deforming, prior to plating the one or more outwardly-facing surfaces of the plurality of spokes of the wheel with the sheet of material, one or more outwardly-facing surfaces of the sheet rim of the sheet of material using one or more hammering or punching instruments such that all of the outwardly-facing surfaces of the sheet rim of the sheet of material define one or more sheet rim worked surfaces,
wherein all of the outwardly-facing surfaces of the sheet of material positioned at radial distances from the center of the sheet of material greater than the radial separation distance define worked surfaces such that the one or more sheet rim worked surfaces and the worked surfaces of the plurality of sheet spokes together define continuous worked surfaces.

15. The method of claim 1, further comprising:
deforming, prior to plating the one or more outwardly-facing surfaces of the plurality of spokes of the wheel with the sheet of material, a plurality of outwardly-facing surfaces of the sheet rim of the sheet of material using one or more hammering or punching instruments, wherein each of the deformed outwardly-facing surfaces of the sheet rim of the sheet of material is positioned radially exterior to a respective sheet spoke of the plurality of sheet spokes such that a portion of the sheet rim radially exterior to each sheet spoke of the plurality of overlaid sheet spokes defines a sheet rim worked surface; and
leaving all of the outwardly-facing surfaces of the sheet rim of the sheet of material circumferentially positioned between sheet spokes of the plurality of sheet spokes undeformed by the one or more hammering or punching instruments such that one or more smooth unworked surfaces of the sheet rim of the sheet of material separates each consecutive pair of sheet rim worked surfaces each positioned radially exterior to the respective sheet spoke.

16. The method of claim 1, further comprising:
leaving all of the outwardly-facing surfaces of the sheet rim of the sheet of material circumferentially undeformed by the one or more hammering or punching instruments such that all of the outwardly-facing surfaces of the sheet rim define one or more smooth unworked surfaces of the sheet rim of the sheet of material.

* * * * *